United States Patent Office 3,503,962
Patented Mar. 31, 1970

3,503,962
ISOINDOLINO-SULFONYLUREA DERIVATIVES
Laszlo Beregi, Boulogne-sur-Seine, Pierre Hugon, Rueil-Malmaison, and Jacques Duhault, Chatou, France, assignors to Science Union et Cie, Societe Francaise de Recherche Medicale, Suresnes, France, a society of France
No Drawing. Filed June 27, 1966, Ser. No. 560,809
Claims priority, application Great Britain, July 14, 1965, 29,841/65
Int. Cl. C07d 49/22, 51/44, 85/46, 91/36
U.S. Cl. 260—239.6                    17 Claims

ABSTRACT OF THE DISCLOSURE

Urea N-substituted by

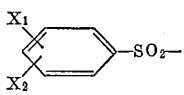

wherein $X_1$ and $X_2$ are hydrogen, halogen, lower-alkyl or lower-alkoxy up to $C_5$ inclusive, amino, acetylamino, or nitro, and N'-substituted by

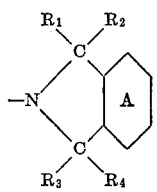

wherein $R_1$, $R_2$, $R_3$ and $R_4$ are hydrogen or phenyl and A is a six-membered saturated or unsaturated cyclic hydrocarbon ring which may also have certain substituents.

These compounds possess blood sugar lowering activity.

---

The present invention provides new N-arylsulfonyl-N'-(2-isoindolino) urea derivatives represented by the general formula:

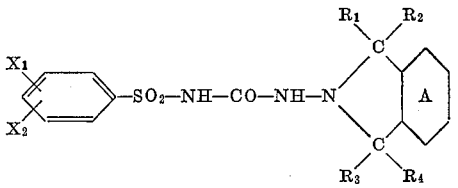

wherein $X_1$ and $X_2$ are independently substituents selected from the group consisting of— a hydrogen atom,
a halogen atom,
a lower-alkyl radical containing 1 to 5 carbon atoms, inclusive,
a lower-alkoxy radical containing 1 to 5 carbon atoms, inclusive,
an amino radical, an acetylamino radical, and
a nitro radical, the general Formula II:

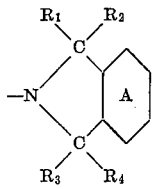

represents an isoindole radical in which A is a six membered saturated or unsaturated cyclic hydrocarbon ring, such as phenyl, cyclohexane, endomethylene-cyclohexane, cyclohexene, endomethylene-cyclohexene, endoxocyclohexane or endoxo-cylohexene, which may be substituted by one or more halogen atoms, lower-alkyl and lower alkoxy radicals, nitro, or amino radicals, and wherein $R_1$, $R_2$, $R_3$ and $R_4$ each represent a hydrogen atom, or phenyl.

The invention also includes the salts of the above compounds.

The N-arylsulfonyl-N'-(isoindolino) ureas of the present invention can be prepared by reacting an arylsulfonyl urethane with an N-amino isoindoline, according to the process disclosed by Marshall et al., J. Org. Chem. 23, 927 (1958), the said N-amino isoindoline having the general Formula III:

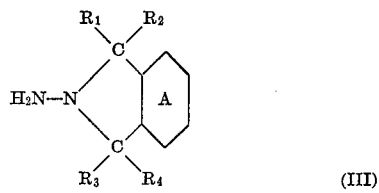

wherein $R_1$, $R_2$, $R_3$, $R_4$ and A have the same meanings as earlier specified.

The starting N-amino isoindoline can be prepared utilizing the process of W. Baker et al., J. Chem. Soc. 2971 (1961), which involves nitrosating an isoindoline and reducing the resulting N-nitroso isoindoline with lithium aluminium hydride.

To prepare the amino-substituted arylsulfonyl isoindolino-ureas, the acetylamino isoindolino-aryl sulfonylurea obtained by the here-above process is heated at reflux for 2 hours with a 4 N solution of KOH, then poured into water and neutralized with a 4 N solution of HCl. The precipitate is dried, then recrystallized in isopropanol.

To obtain the hexahydroisoindolino sulfonylureas, the corresponding tetrahydroisoindolino-sulfonylurea, prepared as per the above process, is hydrogenated in a solvent such as dimethylformamide using platinum oxide under 5 atmospheres of initial hydrogen pressure.

The compounds of the invention may be readily obtained in the form of their salts either with acids or with bases compatible in regard to the application contemplated. Among the acids that may be used, hydrochloric, hydrobromic, sulphonic, acetic, malonic, maleic, fumaric, tartaric, malic, and the like, may be mentioned. The bases include alkali metal hydroxides, alkaline earth metal hydroxides, and amino-alcohols, such as 1-amino-2-propanol, 2-amino-2-methyl-1-propanol and choline.

These new compounds and their addition salts possess interesting therapeutic properties, particularly hypoglycemic properties, and may be used as medicaments, e.g., in the treatment of diabetes. They are ordinarily administered in conjunction with the usual appropriate pharmaceutical carriers.

The toxicity of the new isoindolino-sulfonylureas is very low. No mortality was noted in 48 hours when 3 gr./kg. of the new compounds were administered orally to mice.

The blood sugar lowering activity was studied in the rat and rabbit with doses of 10 to 25 mg./kg. An important reduction of the blood sugar was obtained with all the compounds tested. The blood sugar reduction observed was as high as 53% using 10 mg./kg. in the rabbit, and as high as 38% using 25 mg./kg. in the rat.

In comparison, tolbutamide, an antidiabetic well known and widely used in human patients, produces at a dose of 25 mg./kg., a reduction of only 19% of the blood sugar in the rabbit, and 50 mg./kg. are needed to obtain a blood sugar lowering activity of 23% in the rat.

Some examples of practical procedures for preparing compounds according to the invention are described below for purposes of illustration but not of limitation. In the examples, all parts are given by weight and melting points are determined by the Kofler test.

EXAMPLE 1

N-(4-methyl benzenesulfonyl)-N'-(2-isoindolino) urea

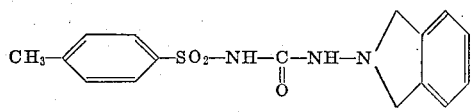

To a suspension containing 12.2 parts of 4-methylbenzenesulfonylurethane and 22 parts of toluene are rapidly added 6.7 parts of N-amino-isoindoline in 22 parts of toluene. Within a few minutes, the mixture is converted into a solution. The reaction mixture is heated at reflux for 2 hours. The resulting clear solution crystallises on cooling. The crystals are filtered, washed with 8 parts of toluene, then recrystallized from anhydrous ethanol. There are obtained 9 parts of product melting at 198–199° C.

By a similar procedure, the following sulfonylurea compounds were obtained:

(a) N-(4-ethylbenzenesulfonyl)-N'-(2-isoindolino) urea, M.P. 187° C. (methanol)

(b) N - (4 - chlorobenzenesulfonyl) - N'-(2-isoindolino) urea, M.P. 206–207° C. (dimethylformamide/water)

(c) N-(benzenesulfonyl)-N'-(2-isoindolino) urea, M.P. 200–202° C. (ethanol)

(d) N - (4-methoxybenzenesulfonyl)-N'-(2-isoindolino) urea, M.P. 174–177° C. (ethanol)

(e) N - (3,4-dichlorobenzenesulfonyl)-N'-(2-isoindolino) urea, M.P. 210–212° C. (dimethylformamide/water)

(f) N - (4 - methylbenzenesulfonyl)-N'-[2-(isoindolino-5-bromo)]urea—M.P. 203–204° C. (dioxan)

(g) N - (4 - methylbenzenesulfonyl) - N'-[2-(3c.4.7.7c-tetrahydroisoindolino)]urea — M.P. 196 – 197° C. (ethanol)

(h) N - (4 - chlorobenzenesulfonyl) - N'-[2-(3c.4.7.7c-tetrahydroisoindolino)]urea—M.P. 196° C. (ethanol)

(i) N - (4 - bromobenzenesulfonyl) - N' - [2-(3c.4.7.7c-tetrahydroisoindolino)]urea—M.P. 209 – 210° (acetone/ethyl acetate)

(j) N - 4 - ethylbenzenesulfonyl)-N' - [2-(3c.4.7.7c-tetrahydroisoindolino)]urea—M.P. 147–148° C. (ethanol)

(k) N - (4 - methylbenzenesulfonyl) - N' - [2-(5-amino isoindolino)]urea—M.P. 236–238° C. (dimethylformamide-water)

(l) N - (4 - methylbenzenesulfonyl)-N'-[2-(1,3-diphenyl-isoindolino)]urea—M.P. 235–237° C. (methanol)

(m) N - (4 - methylbenzenesulfonyl) - N'-[2-(3c.4.7.7c-tetrahydro 4,7-endomethylene isoindolino)]urea—M.P. 215–216° C. (dimethylformamide-water)

(n) N - (4 - methylbenzenesulfonyl) - N' - [2-(3c.4.7.7c-tetrahydro 4,7-endoxo isoindolino)]urea—M.P. 205–207° C. (ethanol)

(o) N - (4 - chlorobenzenesulfonyl) - N'-[2-(3c.4.7.7c-tetrahydro 4,7-endoxo isoindolino)]urea—M.P. 222–224° C. (dimethylformamide-water)

(p) N - (4 - methoxybenzenesulfonyl)-N'-[2-(3c.4.7.7c-tetrahydro 4,7-endoxo isoindolino)]urea—M.P. 196–198° C. (ethyl acetate)

(q) N - (4 - ethylbenzenesulfonyl-N'-[2-(3c.4.7.7c-tetrahydro 4,7-endoxo isoindolino)]urea—M.P. 207–208° C. (isopropanol)

(r) N - (4 - methylbenzenesulfonyl) - N'-[2-(3c.4.7.7c-tetrahydro 5-methyl isoindolino)]urea—M.P. 170–171° C. (ethanol)

(s) N - (4 - methylbenzenesulfonyl) - N'-[2-(3c.4.7.7c-tetrahydro 5,6-dimethyl isoindolino)]urea—M.P. 194–195° C. (ethanol)

EXAMPLE 2

N-(4-aminobenzenesulfonyl)-N'-(2-isoindolino) urea

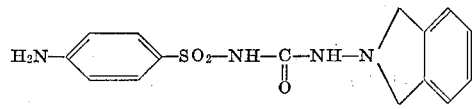

A mixture of 8.5 parts of N-(4-acetylaminobenzenesulfonyl) - N' - (2-isoindolino) urea (prepared in the same manner as given in Example 1) and 130 parts of a 4 N solution of KOH was heated at 90–95° C. for 1½ hour. After cooling, there was added 400 parts of water and the mixture was stirred and filtered. The filtrate was acidified with a 4 N solution of HCl. After filtration, the precipitate was washed with 20 parts of ethanol and recrystallized from 30 parts of dimethylformamide. There was thus obtained 4.6 parts of the desired product melting at 187–188° C.

EXAMPLE 3

N-(3-amino-4-methylbenzenesulfonyl)-N'-(2-isoindolino) urea

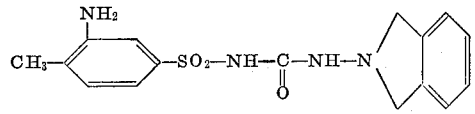

(A) N - (3 - nitro - 4 - methylbenzenesulfonyl)-N'-(2-isoindolino) urea.—In the same manner as given in Example 1, N-(3-nitro-4-methylbenzenesulfonyl)-N'-(2-isoindolino) urea was prepared by substituting 3-nitro-4-methylbenzenesulfonylurethane for 4-methylbenzenesulfonylurethane.

(B) N - (3 - amino- 4 -methylbenzenesulfonyl)-N'-(2-isoindolino) urea.—5.7 parts of N-(3-nitro-4-methylbenzenesulfonyl)-N'-(2-isoindolino) urea in 100 parts of dimethylformamide with 2 parts of Raney nickel were hydrogenated at a pressure of 5 atm. of hydrogen. The resulting crude solid was recrystallized from 120 parts of ethanol to produce 3 parts of the desired compound melting at 215–216° C. (ethanol).

EXAMPLE 4

N-(4-ethylbenzenesulfonyl)-N'-(2-hexahydroisoindolino) urea

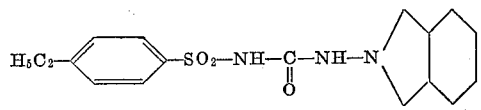

4.2 parts of N-(4 - ethylbenzenesulfonyl)-N'-[2-(3c.4.7.7c-tetrahydroisoindolino)] urea were hydrogenated in 100 parts of dimethylformamide with 0.4 parts of platinum oxide at an initial pressure of 5 atm. of hydrogen. After 2 hours, the catalyst was removed by filtration and the filtrate was diluted with 500 parts of water. The precipitate was recrystallized from 25 parts of isopropanol. There was thus obtained 3 parts of the desired product melting at 150–152° C.

By a similar procedure the following sulfonylurea compounds were obtained:

(a) N-(4-methylbenzenesulfonyl)-N' - 2 - hexahydroisoindolino) urea, M.P. 170–172° C. (ethanol).

(b) N-(4-chlorobenzenesulfonyl) - N' - (2-hexahydroisoindolino) urea, M.P. 190–191° C. (ethanol).

(c) N-(4-bromobenzenesulfonyl) - N' - (2-hexahydroisoindolino) urea, M.P. 211–212° C. (ethanol).

(d) N-(4 - methylbenzenesulfonyl) - N' - [2-(4,7-endomethylene hexahydroisoindolino)] urea, M.P. 199–200° C. (ethanol).

What we claim is:

1. A compound selected from the group consisting of (A) new isoindolino-sulfonylurea compounds of the Formula I

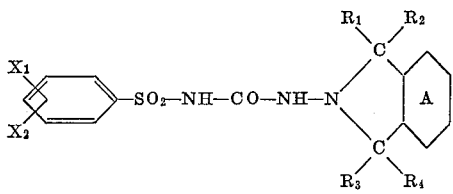

wherein:
X₁ and X₂ are independently substituents selected from the group consisting of hydrogen, halogen, lower-alkyl containing 1 to 5 carbon atoms, inclusive, lower-alkoxy containing 1 to 5 carbon atoms, inclusive, amino, acetylamino and nitro, A is a six-membered cyclic hydrocarbon ring selected from the group consisting of phenyl, cyclohexane, endomethylene - cyclohexane, cyclohexene, endomethylene-cyclohexene, endoxo-cylohexane, and endoxo-cyclohexene, and such rings which have a substituent selected from the group consisting of halogen, lower-alkoxy, lower-alkyl, nitro and amino, and $R_1$, $R_2$, $R_3$ and $R_4$ each represent a member selected from the group consisting of hydrogen and phenyl, and (B) physiologically acceptable addition salts thereto with acids and bases.

2. A compound of claim 1 which is N-(4-methylbenzenesulfonyl)-N'-(2-isoindolino) urea.

3. A compound of claim 1 which is N-(4-chlorobenzenesulfonyl)-N'-(2-isoindolino) urea.

4. A compound of claim 1 which is N-(4-methoxybenzenesulfonyl)-N'-(2-isoindolino) urea.

5. A compound of claim 1 which is N-(3,4-dichlorobenzenesulfonyl)-N'(2-isoindolino) urea.

6. A compound of claim 1 which is N-(4-methylbenzenesulfonyl)-N'-[2-(isoindolino-5-bromo)] urea.

7. A compound of claim 1 which is N-(4-methylbenzenesulfonyl) - N' - [2-(3c.4.7.7c-tetrahydroisoindolino)] urea.

8. A compound of claim 1 which is N-(4-bromobenzenesulfonyl) - N' - [2-(3c.4.7.7c-tetrahydroisoindolino)] urea.

9. A compound of claim 1 which is N-(4-methylbenzenesulfonyl)-N'-[2-(1,3-diphénylisoindolino)] urea.

10. A compound of claim 1 which is N-(4-methylbenzenesulfonyl)-N'-[2-(3c.4.7.7c-tetrahydro 4,7-endoxo isoindolino)] urea.

11. A compound of claim 1 which is N-(4-ethylbenzenesulfonyl)-N'-[2-(3c.4.7.7c-tetrahydro 4,7-endoxo isoindolino)] urea.

12. A compound of claim 1 which is N-(4-methylbenzenesulfonyl)-N'-[2-(3c.4.7.7c - tetrahydro 5-methyl isoindolino)] urea.

13. A compound of claim 1 which is N-(4-aminobenzene)-N'-(2-isoindolino) urea.

14. A compound of claim 1 which is N-(4-methylbenzenesulfonyl)-N'-(2-hexahydroisoindolino) urea.

15. A compound of claim 1 which is N-(4-chlorobenzenesulfonyl)-N'-(2-hexahydroisoindolino) urea.

16. A compound of claim 1 which is N-(4-lower-alkylbenzenesulfonyl)-N'-(2-isoindolino) urea.

17. A compound of claim 1 which is N-(4-lower-alkylbenzenesulfonyl)-N'-[2-(3c.4.7.7c-tetrahydro 4,7-endoxo isoindolino)] urea.

References Cited
UNITED STATES PATENTS 2,408,066   9/1946   Hentrich et al. _____ 260—397.7

ALEX MAZEL, Primary Examiner

J. A. NARCAVAGE, Assistant Examiner

U.S. Cl. X.R.

260—326.1; 424—274, 229

UNITED STATES PATENT OFFICE
CERTIFICATE OF CORRECTION

Patent No. 3,503,962          Dated March 31, 1970

Inventor(s) Laszlo Beregi, et al.

It is certified that error appears in the above-identified patent and that said Letters Patent are hereby corrected as shown below:

| | |
|---|---|
| Column 6, line 18 | "N-(4-aminobenzene)" should read |
| Claim 13 | --- N-(4-aminobenzenesulfonyl) --- |
| Appl. Page 8 | |
| | |
| Column 5, line 26 | "thereto" should read |
| Appl. Page 3 of Amendment dated Jan. 29, 1969 | --- thereof --- |
| | |
| Column 1, line 55 | "lower" should read |
| Appl. Page 1, line 9 | --- lower --- |

Signed and sealed this 22nd day of June 1971.

(SEAL)
Attest:

EDWARD M. FLETCHER, JR.          WILLIAM E. SCHUYLER, JR.
Attesting Officer                    Commissioner of Patents